United States Patent [19]
Brodsky et al.

[11] Patent Number: 5,907,706
[45] Date of Patent: May 25, 1999

[54] INTERACTIVE MODELING AGENT FOR AN OBJECT-ORIENTED SYSTEM

[75] Inventors: Stephen Andrew Brodsky, Los Gatos; Rebecca Mei-Har Lau, San Jose, both of Calif.

[73] Assignee: International Business Machines Corporation, Armonk, N.Y.

[21] Appl. No.: 08/747,057

[22] Filed: Nov. 12, 1996

[51] Int. Cl.⁶ .................................................. G06F 9/44
[52] U.S. Cl. .......................... 395/701; 395/683; 345/337; 345/347; 345/333; 345/339; 345/967; 434/350
[58] Field of Search .................................... 345/335, 340, 345/337, 967, 347, 326, 333, 336, 339, 348, 352, 433; 395/683, 701, 704, 682; 434/350, 366

[56] References Cited

U.S. PATENT DOCUMENTS

| | | | |
|---|---|---|---|
| 4,845,665 | 7/1989 | Heath et al. | 345/333 |
| 4,964,077 | 10/1990 | Eisen et al. | 345/337 |
| 5,247,651 | 9/1993 | Clarisse | 395/500 |
| 5,257,363 | 10/1993 | Shapiro et al. | 395/500 |
| 5,315,709 | 5/1994 | Alston, Jr. et al. | 707/6 |
| 5,325,533 | 6/1994 | McInerney et al. | 395/701 |
| 5,327,529 | 7/1994 | Fults et al. | 345/335 |
| 5,390,320 | 2/1995 | Smithline | 395/500 |
| 5,390,330 | 2/1995 | Talati | 395/703 |
| 5,421,015 | 5/1995 | Khoyi et al. | 395/677 |
| 5,434,965 | 7/1995 | Matheny et al. | 345/338 |
| 5,437,037 | 7/1995 | Furuichi | 395/707 |
| 5,475,817 | 12/1995 | Waldo et al. | 395/683 |
| 5,499,371 | 3/1996 | Henninger et al. | 395/702 |
| 5,515,497 | 5/1996 | Itri et al. | 345/340 |
| 5,528,503 | 6/1996 | Moore et al. | 364/468.01 |
| 5,537,630 | 7/1996 | Berry et al. | 345/326 |
| 5,542,040 | 7/1996 | Chang et al. | 345/335 |
| 5,555,365 | 9/1996 | Selby et al. | 380/24 |
| 5,557,518 | 9/1996 | Rosen | 380/24 |
| 5,727,950 | 3/1998 | Cook et al. | 434/350 |
| 5,732,271 | 3/1998 | Berry et al. | 395/683 |

OTHER PUBLICATIONS

Citrin, Wayne, et al., "Using Formalized Temporal Message–flow Diagrams," *Software–Practice and Experience*, vol. 25, No. 12, pp. 1367–1401, Dec. 1995.

Coats, Mark, et al., "Constructing Operational Specifications," *Dr. Dobb's Journal of Software Tools for Professional Programmer*, vol. 20, No. 6, pp. 18–33, Jun. 1995.

De Man, Josef, et al., "Towards a formal Semantics of Message Sequence Charts", *SDL 93 Using Objects. Proceedings of the Sixth SDL Forum 1993*, pp. 157–165, 1993.

De Man, Jozef, et al., "Developing Formal Specifications with Message Sequence Charts", *XIV International Switching Symposium*, vol. 2, pp. 134–137, Oct. 1992.

Ek, Anders, "Verifying Message Sequence Charts with the SDT Validator," *SDL '93, Using Objects, Proceedings of the Sixth SDL Forum 1993*, pp. 237–249.

Grabowski, Jens, et al., "The Standardization of Message Sequence Charts," *Proceedings 1993: Software Engineering Standards Symposium*, pp. 48–63, 1993.

Graubmann, Peter, et al., "Towards a Petri Net Based Semantics Definition for Message Sequence Charts,"*SDL 93: Using Objects*, pp. 179–190, 1993.

(List continued on next page.)

*Primary Examiner*—Tariq R. Hafiz
*Assistant Examiner*—Tuan Q. Dam
*Attorney, Agent, or Firm*—Merchant, Gould, Smith, Edell, Welter & Schmidt

[57] ABSTRACT

Modeling a system using object-oriented programming tools is enhanced using a monitor built into the programming tool. The monitor can monitor in the background or in real time. Programming times are reduced and efficiency of code generation is increased by the interactive modeling agent monitoring the ongoing efforts of a user and interactive with the user through the use of windows and suggestive text on how to better use the programming language, tools, and constructs to create a better resulting model and program.

27 Claims, 7 Drawing Sheets

OTHER PUBLICATIONS

Hadzilacos, Thanasis, et al., "Transaction Synchronisation in Object Bases", *Journal of Computer and System Sciences*, vol. 43, pp. 2–24, 1991.

Ito, Atsushi, et al., "Transformation Technique Between Specification in SDL and Specification in Message Sequence Charts for Designing Protocol Specifications," *Supercomm/ICC '92: Discovering a New World of Communications*, IEEE vol. 1, pp. 0442–0447, 1992.

Ladkin, Peter B., et al., "What do Message Sequence Charts Mean?", *IFIP Trans., C, Commun. Syst.*, vol. C, No. 22, pp. 301–316, 1994.

Ladkin, Peter B., et al., "Interpreting Message Flow Graphs," *Formal Aspects of Computing 1995*, vol. 7, No. 5, pp. 473–509, 1995.

Mauw, S., et al., "An Algebraic Semantics of Basic Message Sequence Charts," *The Computer Journal*, vol. 37, No. 4, pp. 269–277, 1994.

Mauw, S., et al., "A Formal Semantics of Synchronous Interworkings," *SDL '93 Using Objects: Proceedings of the Sixth SDL Forum 1993*, pp. 167–178.

Moriyasu, Kenji, et al., "A Method of Applying Message Sequence Chart Specifications for Services with Variant Process Structure," *Electronics and Communications in Japan*, Part 1, vol. 78, No. 9, pp. 12–24, 1995.

Okamoto, Mitsuhiro, et al., "A Verification Scheme for Service Specifications Described by Information Sequence Charts," *IEICE Trans. Commun.*, vol. E75–B, No. 10, pp. 978–985, Oct. 1992.

Thrampoulidis, K.X., et al., "Object Interaction Diagram: A New Technique in Object–oriented Analysis and Design," *Journal of Object–Oriented Programming*, vol. 8, No. 3, pp. 25–32, Jun. 1995.

Banerji et al. "The Substrate Object Modeland Architecture", IEEE, 1993, pp. 31–40, Dec. 10, 1993.

FIG. 4 under section 102(b) of the U.S. Patent Laws from a filing date on a foreign patent application, the present application claims priority from a prior U.S. patent application, or any other reason, is not relevant in determining patentability.

INTERACTIVE MODELING AGENT FOR AN OBJECT-ORIENTED SYSTEM

CROSS-REFERENCE TO RELATED APPLICATIONS

This application is related to the following co-pending and commonly-assigned patent applications:

Application Ser. No. 08/747,415 entitled "METHOD FOR SYNCHRONIZING CLASS, METHODS, ATTRIBUTES AND OBJECT PROPERTIES ACROSS AN OBJECT-ORIENTED SYSTEM," filed on same date herewith, by Stephen A. Brodsky, Timothy J. Grose and Roni Korenshtein;

Application Ser. No. 08/747,414 entitled "LAYOUT METHOD FOR ARC-DOMINATED LABELLED GRAPHS," filed on same date herewith, by Subrata Mitra and Dipayan Gangopadhyay;

Application Ser. No. 08/747,417 entitled "NOTIFICATION MANAGER FOR AN OBJECT-ORIENTED SYSTEM," filed on same date herewith, by Stephen A. Brodsky and Timothy J. Grose;

Application Ser. No. 08/747,416 entitled "MULTI-OBJECT VIEWS IN AN OBJECT MODELING TOOL," filed on same date herewith, by Roni Korenshtein;

Application Ser. No. 08/747,058 entitled "EXECUTION ENGINE IN AN OBJECT MODELING TOOL," filed on same date herewith, by Stephen A. Brodsky, Gary C. Doney, Dipayan Panwar, and Subrata Mitra;

all of which applications are incorporated by reference herein.

BACKGROUND OF THE INVENTION

1. Field of the Invention

This invention relates generally to object-oriented systems, and in particular to an interactive modeling agent for an object-oriented system.

2. Description of Related Art

The development of application and system software has traditionally been a time consuming task. Software engineering has attempted to overcome the limitations of traditional techniques by using new, more efficient programming techniques, such as object-oriented programming. Object-oriented programming has emerged as a method of programming computers that allows for rapid development, implementation, and customization of new software programs by using models to simulate the system prior to generating any software code. Object-oriented programming is also made more "user friendly" by using graphical user interfaces (GUIs) to assist in the modeling portion of the program development.

Object-oriented programming alone, however, is not the complete solution to software development limitations on time, effort, and efficiency. The use of object-oriented programming is in itself difficult, and requires knowledge of the object-oriented programming languages, tools, modeling, and programming techniques to produce working object-oriented code. Currently, object-oriented programming languages rely on cumbersome manuals and user experience to make object-oriented programming a more efficient and cost-effective tool for programming. The manuals are not real time or efficient aids for the novice or advanced object-oriented user for use in creating object-oriented programs.

It can be seen then, that there is a need for additional tools to assist in creating object-oriented programs. It can also be seen then that real-time interaction between the user and the computer will assist in creating object-oriented programs.

SUMMARY OF THE INVENTION

To overcome the limitations in the prior art described above, and to overcome other limitations that will be come apparent upon reading and understanding the present specification, the present invention discloses a powerful and highly productive object-oriented system. The system solves the above-described problems by monitoring the creation of the object-oriented program in real-time, triggering an interactive agent to interact with a user once an event occurs during the creation of the program in the object-oriented system, and displaying information for assisting the user with the creation of the program in the object oriented system.

One object of the present invention is to provide an improved object-oriented programming environment. Another object of the present invention is to assist users in creating efficient object-oriented programs. Still another object of the present invention is to reduce the amount of time required to produce object-oriented programs.

These and various other advantages and features of novelty which characterize the invention are pointed out with particularity in the claims annexed hereto and forma a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

The present invention comprises an object-oriented tool for modeling an application. Using the present invention, a user can interactively develop and validate a model for a specified application by visually representing classes, objects, and messages in the application and the way they interact. The present invention also allows a user to execute the model to simulate processing by the application.

The present invention integrates the best of two major schools of current object-oriented modeling techniques, including those emphasizing structural modeling, such as Rumbaugh's object modeling technique (OMT) and the Booch method, as well as those starting with modeling of scenario-based behavior (such as object behavior analysis). As a result of using this object-oriented tool to model an application or system, the user can generate a set of definitions or classes representing the structure and behavior of the application, as well as documentation for the model.

Using the present invention, a user develops a model of an application by defining what the application will do and how the application will be implemented. Classes, objects, and scenarios are fundamental in such modeling techniques. The class defines the structure (attributes and relationships) and behavior for an entity (called an instance or object). An instance or object is an entity that takes its structure and behavior from its class. A scenario is a sequence of messages among objects.

Generally, when working with objects, classes and scenarios in the modeling tool of the present invention, the user performs a number of different actions, including but not limited to creating classes, objects, and collections, creating scenarios, running the model, adding attributes, defining relationships, defining operations, adding states and transitions, and writing operations. Many of these actions are iterative. Generally, in creating a model, the user first decides on the main classes or objects, some of the attributes of those classes and objects, and some of the operations performed thereon. In successive iterations, classes and objects become fairly stable, as do attributes. However, the operations generally continue to grow and evolve within the model.

Hardware Environment

Figure 1:
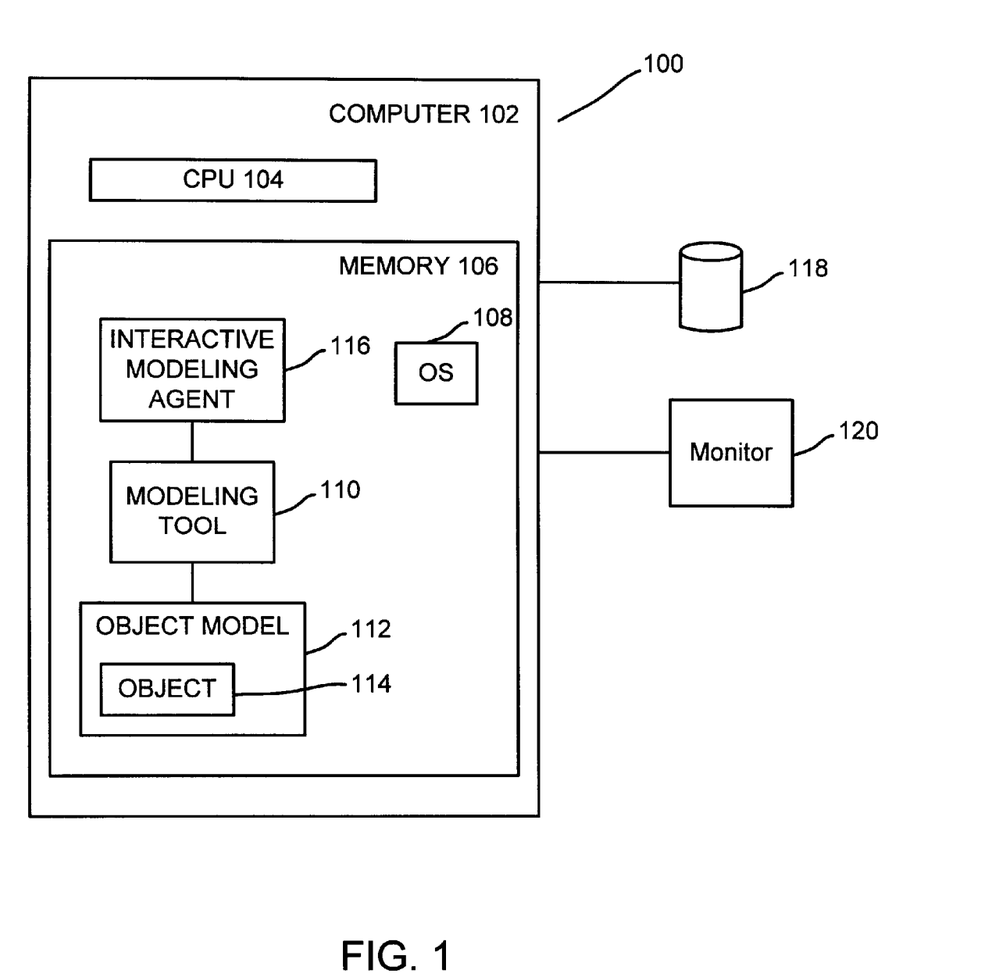
FIG. 1 illustrates an exemplary computer system that could be used to implement the present invention.

FIG. 1 illustrates an exemplary computer system 100 that could be used to implement the present invention. The computer 102 comprises a processor 104 and random access memory (RAM) 106. The computer 102 may be coupled to other devices, such as a monitor, a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106. The present invention is preferably implemented using one or more data structures and computer programs operating under the control of the operating system 108. More specifically, the present invention includes an object-oriented modeling tool 110, an object model 112, various objects 114, and an Interactive modeling agent 116.

In the preferred embodiment, the operating system 108, the object modeling tool 110, the object model 112, and the objects 114 are all tangibly embodied in a computer-readable medium, e.g., data storage device 118, which could include one or more fixed or removable data storage devices, such as a removable cartridge drive, floppy disc drive, hard drive, CD-ROM drive, tape drive, etc. The computer 102 displays characters, text, and graphics on a monitor 120 which allows a user to view what operations the computer 102 is performing using modeling tool 110. Further, the operating system 108, the object modeling tool 110, the object model 112, and the objects 114 are all comprised of instructions which, when read and executed by the computer 102, causes the computer 102 to perform the steps necessary to implement and/or use the present invention. Of course, those skilled in the art will recognize many modifications may be made to this configuration without departing from the scope of the present invention.

Interactive Modeling Agent

Figure 2:
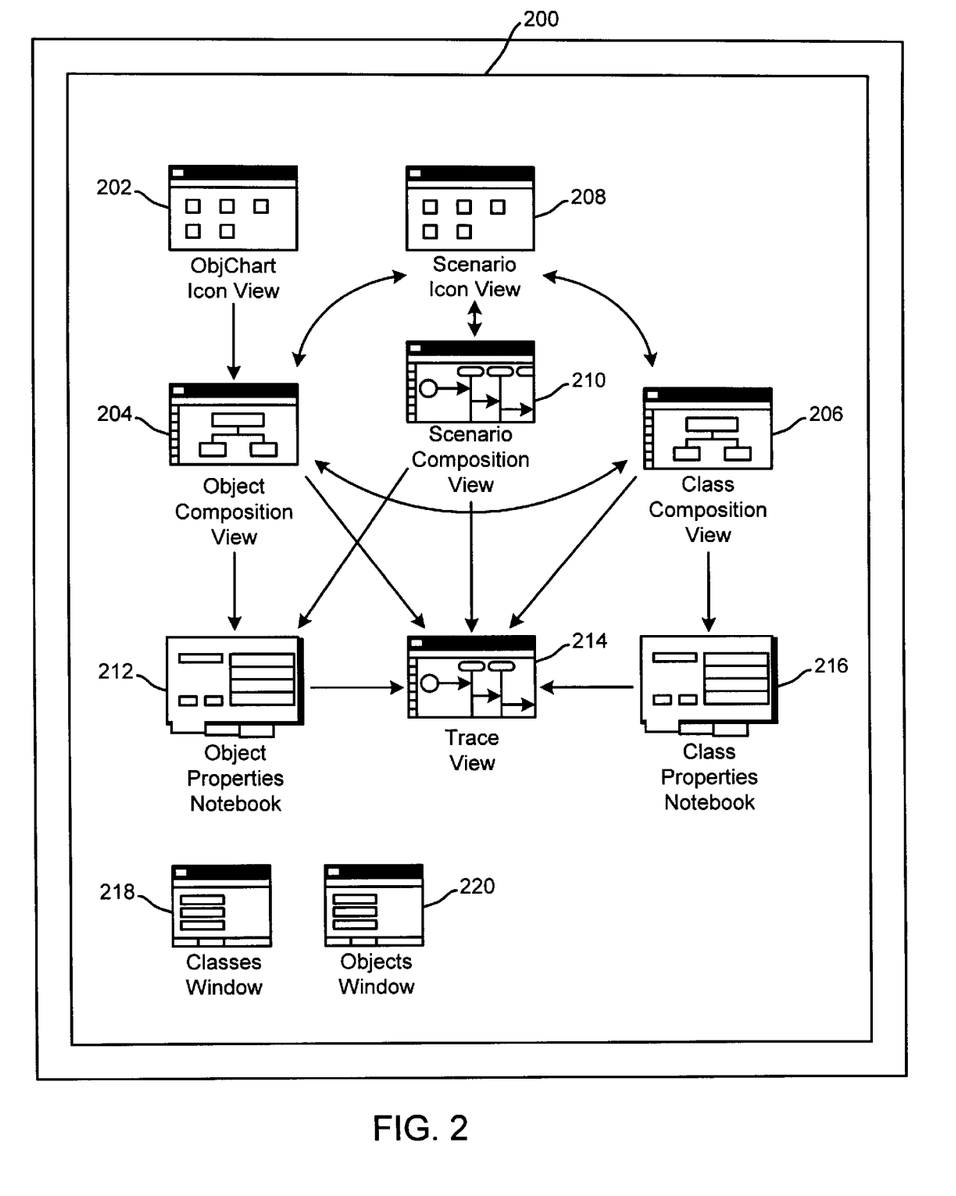
FIG. 2 shows a number of different windows or views in a graphical user interface (GUI) displayed on a monitor of the computer by the modeling tool of the present invention.

FIG. 2 shows a number of different windows or views in a graphical user interface (GUI) 200 displayed on a monitor 120 of the computer 102 by the object modeling tool 110 of the present invention, wherein these views are used to interact with the user in the construction of an object model 112 or its component parts. The GUI 200 includes a number of different views, including an OBJCHART™ Icon View 202, from International Business Machine Corporation, an Object Composition View 204, a Class Composition View 206, a Scenario Icon View 208, a Scenario Composition View 210, an Object Properties Notebook 212, a Trace View 214, a Class Properties Notebook 216, a Class Window 218, and an Object Window 220. Each of these views 202–220 may comprise one or more objects 114, or alternatively, a component part of a single object 114.

The modeling process uses several different views to allow users to view different levels and properties of the classes, objects, and scenarios of the object model 112 to adequately create the object model 112. Icon View 202 shows previous object models 112 that are resident on the computer system. To view a previously created object model 112, or to create a new object model 112, the user uses the Object Composition View 204. The Object Composition View 204 allows the user to view an object and see and alter the attributes, methods, and interrelationships that the object has with other objects.

Alternatively, a user can look at the Class Composition View 206 that allows a user to view a class and see the attributes, methods, and interrelationships that the class has with other classes.

A user may wish to view the different scenarios that have been graphically entered. The Scenario Icon View 208 shows the different scenarios that have been stored in the computer 102, and the Scenario Composition View 210 allows the user to see, create, and alter the scenarios.

An additional view that the user may wish to see is the Object Properties Notebook 212. The Object Properties Notebook 212 allows the user to see what methods and interrelationships exist for a given object. Further, the user may wish to see the properties for a given class, which are located in the Class Properties Notebook 216.

The user can view a trace of the entire object model 112 by using the Trace View 214. The Trace View 214 shows a flow of the entire object model 112 using objects, classes, and scenarios to create a flowchart that visually displays to the user what the object model 112 is doing at a given step in the object model 112.

Additionally, users may wish to view a Class Window 218 to see the enumerated classes used in an object model 112, or a Object Window 220 to see the enumerated objects used in a given class for the object model 112.

All of the views 202–220 on FIG. 2 show the object model 112 to the user in a different way, highlighting some information while downplaying other information. Strategic use of the views 202–220 will enable the user to more easily use the modeling tool 110.

FIGS. 3A–3D illustrate different windows or views in a graphical user interface (GUI) 200 displayed on a monitor of the computer 102 by the object modeling tool 110 of the present invention, wherein these views illustrate the creation of an object model 112 using an interactive modeling agent 116 of the present invention. In the preferred embodiment, the interactive modeling agent 116 comprises functionality embedded within the modeling tool 110.

Figure 3A:
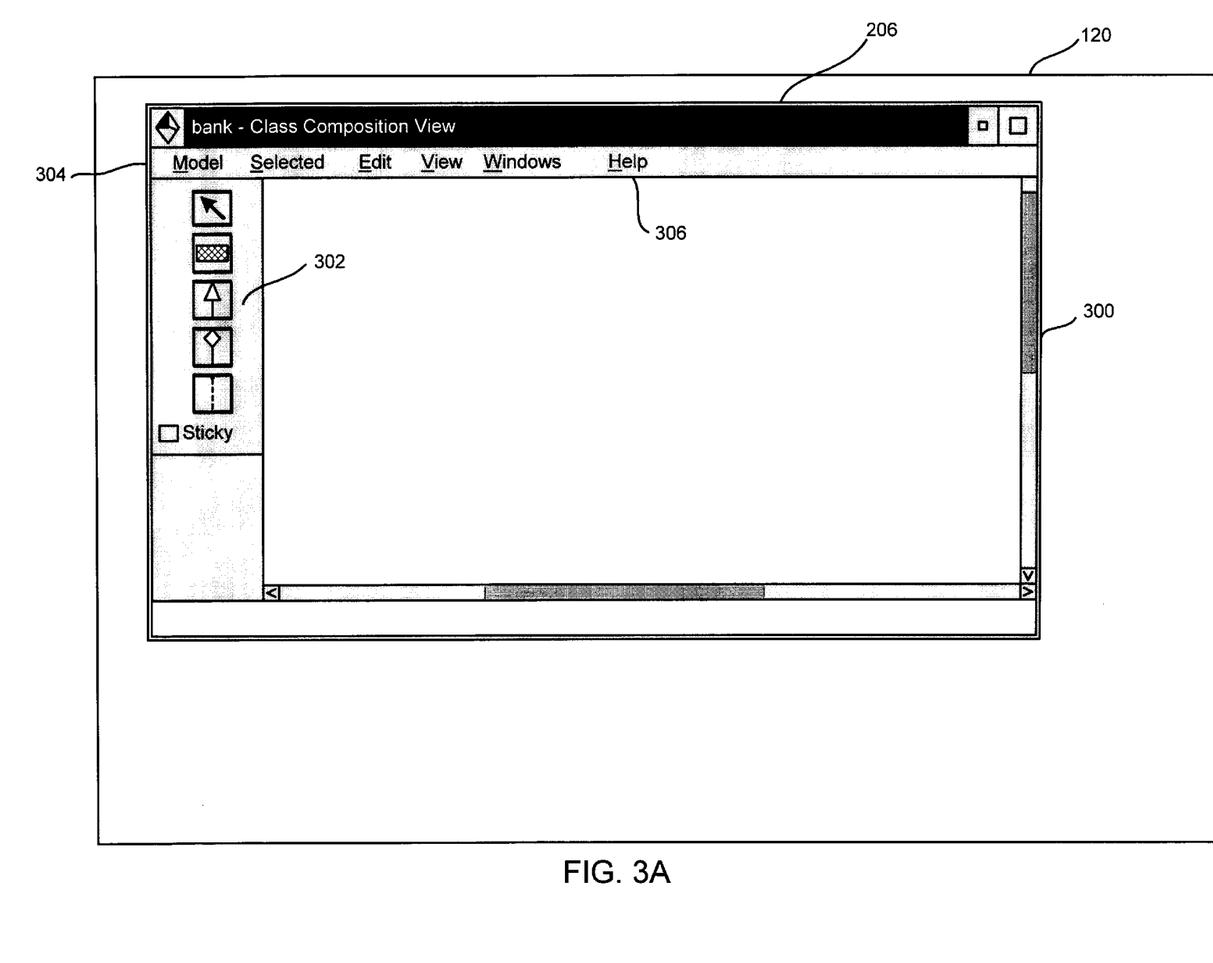
FIGS. 3A through 3D are diagrams illustrating the creation of a model using the present invention.

FIG. 3A shows a screen capture 300 in the Class Composition View 206. There are tool palette buttons 302 for use in creating classes to make the model. There are also pull-down menus 304 to be used for additional functions of the modeling tool 110.

When the user begins to construct the object model 112, there are no classes, objects, or scenarios in the model 112. If the user is a novice, or is not accustomed to using the modeling tool 110, the user must use the help menu 306 in the pull-down menus 304, or the hard copy manual to begin his modeling task. This is time-consuming and an inefficient use of the user's time.

Figure 3B:
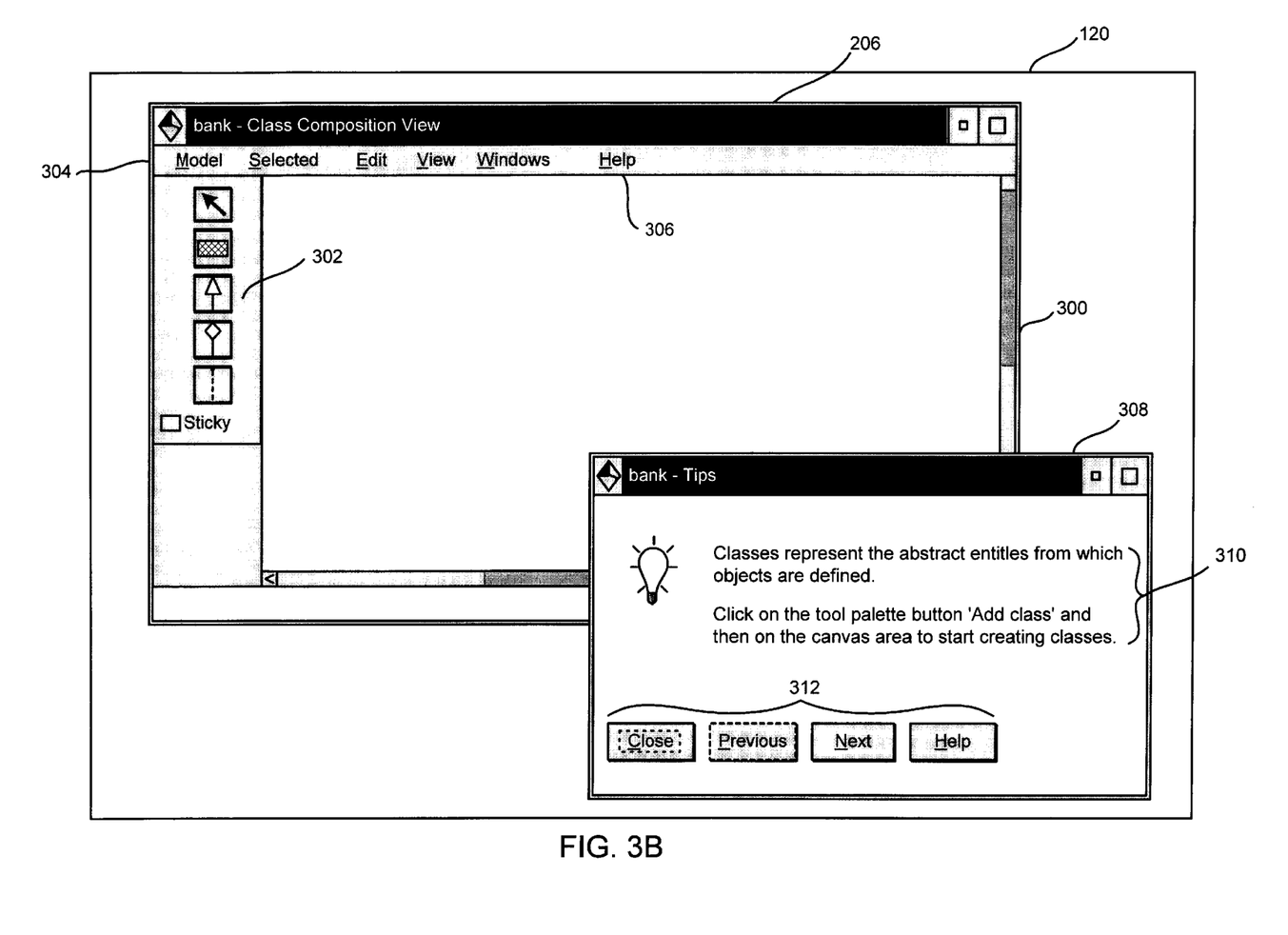

FIG. 3B shows the present invention automatically recognizing that there are no classes in the object model 112. The interactive modeling agent 116 then opens a window 308 that aids the user in his modeling task. In FIG. 3B, the window 308 has text 310 that tells the user what to do to create classes, or objects, or scenarios, depending on where the user is in the construction of the model 112.

The interactive modeling agent 116 provides helpful modeling advice to the user as well as detecting and optionally correcting modeling pitfalls. Certain situations, such as the lack of classes in an object model 112, are observed by the interactive modeling agent 116 during creation of the object model 112, and these events are used to trigger the interactive modeling agent 116 to display text 310 to the user on how to better use the modeling tool 110, better model their situation, and potentially take action to automatically fix the problem detected by interactive modeling agent 116.

There are two general types of situations that trigger the interactive modeling agent 116 to open a window 310: novice triggers that help the user better use the modeling tool 310 and help the user with the elementary principles of modeling; and advanced triggers that help the user perfect the object model 112 by identifying potential imbalances in the modeling approach.

This interaction between user and modeling tool 110 goes beyond the present art of elementary checking for validity of entered data, since the interactive modeling agent 116 is using the current model 112 as a basis for determining how best to improve the user's model 112. Further, interactive modeling agent 116 offers different levels of assistance to the user.

Since the interactive modeling agent 116 is monitoring the user's efforts in real time, the window 308 adds text 310 to the window 308 to explain, in this instance, that classes need to be created, and how to go about creating classes using the modeling tool 110.

Buttons 312 are also provided for the user to be able to close the window 308, go back to a previous window 308 created by the interactive modeling agent 116 for review if necessary, go to the next window 308 to be created by the interactive modeling agent 116 for more information, or go directly to the help menu 306 if the user wants more assistance.

As previously discussed, the interactive modeling agent 116 can be programmed to not display certain windows 308 as the user gains more experience. For example, as the user creates more and more models, the user will know how to create classes at the beginning stages of object model 112 creation, and thus the window 308 shown as an example in FIG. 3B will not be necessary for a more advanced user.

Figure 3C:
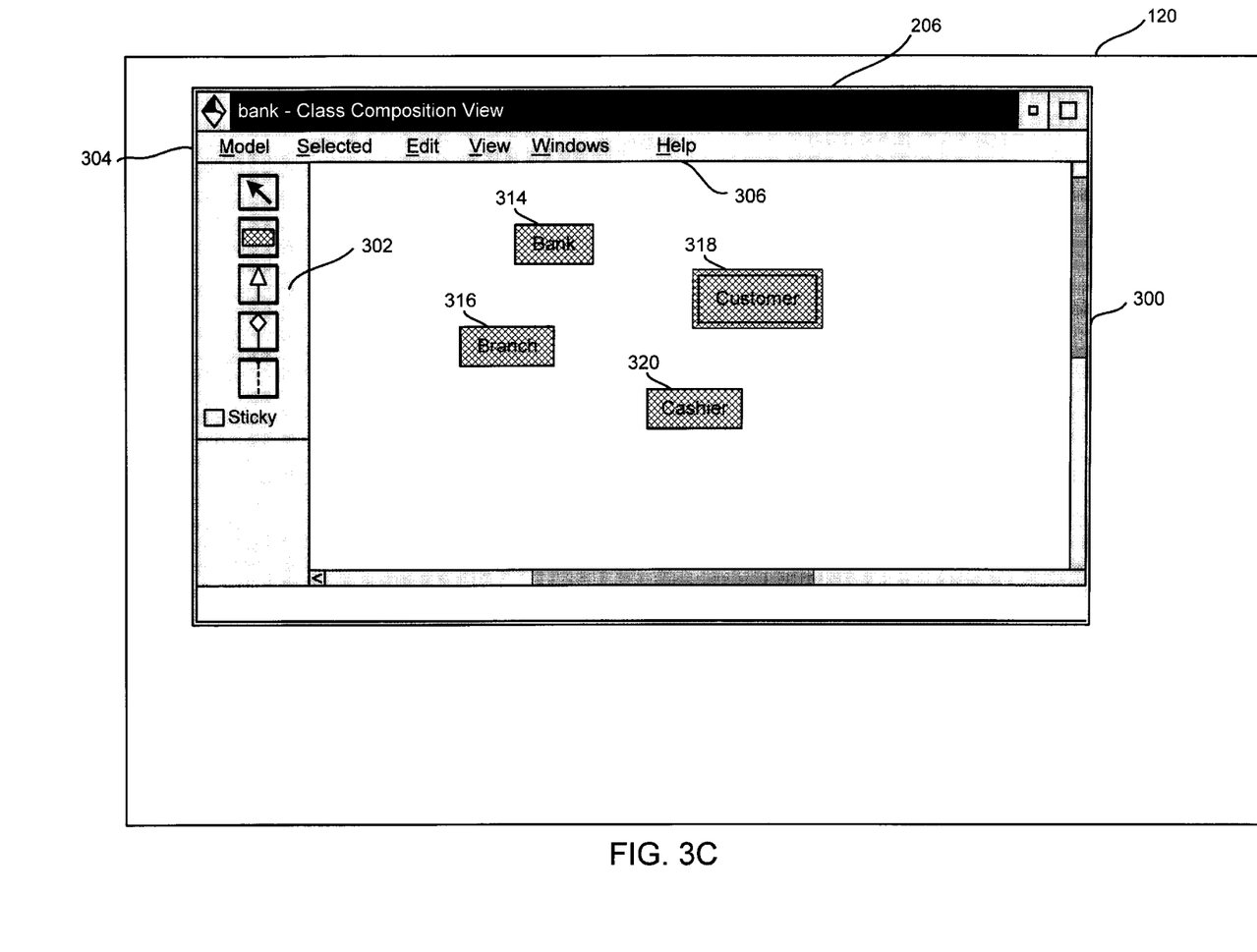

As the user continues creating classes in the object model 112, the screen will look similar to FIG. 3C, with classes created within the Class Composition View 206 window on the computer monitor 120. As an example, bank class 314, branch class 316, customer class 318, and cashier class 320 have been created by the user in the object model 112.

Figure 3D:
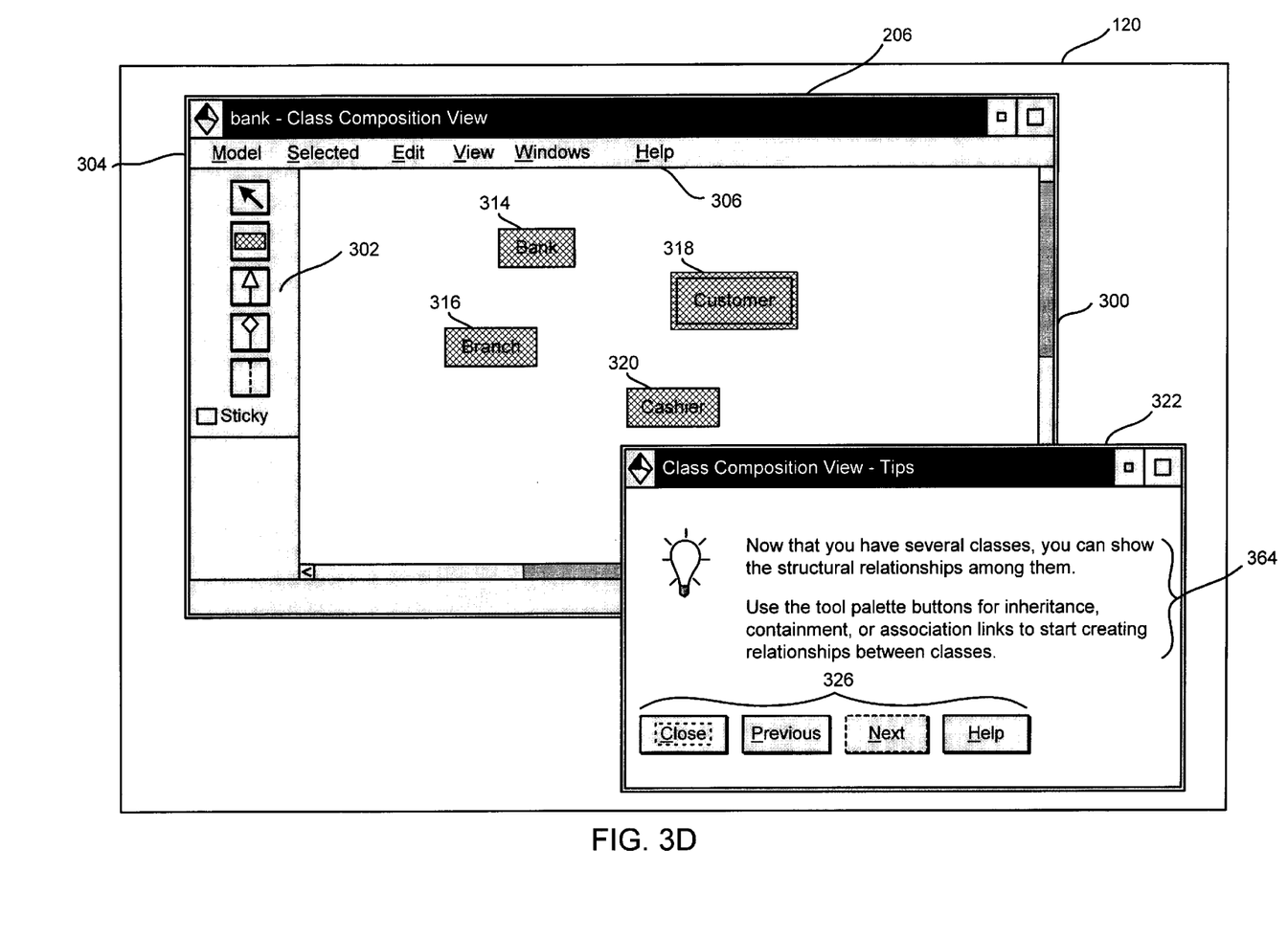

As shown in FIG. 3D, once a certain number of classes have been created, the interactive modeling agent 116, since it is monitoring the user's efforts, will determine that there are no interrelationships between the bank class 314, branch class 316, customer class 318, and cashier class 320, and will open a window 322 to inform the user that interrelationships are required to complete, or to go forward with, the modeling process.

Although window 322 of FIG. 3D and window 308 of FIG. 3B are similar, they can be different in format, size, or color, depending on the determination that the interactive modeling agent 116 makes. For example, if a user creates a class that is identical to another class already in the object model 112, a different colored window 322, e.g., red as opposed to white, may open to inform the user of this occurrence.

The text 324 in window 322 applies to the occurrence that interactive modeling agent 116 has discovered through the real-time monitoring process. The buttons 326 in window 322 are similar to window 308, but can contain additional buttons for different functions, such as performing recommended actions that were discovered by interactive modeling agent 116.

The windows 308 and 322 that are opened up by interactive modeling agent 116 are again of two general types: those that are used by novice users, and those that are used by advanced or experienced users. Novice windows 308 and 322 are triggered to help the user better use the program and help users with the elementary principles of modeling. These windows 308 and 322 include, but are not limited to, e.g., how to use certain functions of the modeling tool 110, transitions to other parts of the program such as another view 202 to 220 as shown in FIG. 2, failure to interrelate or use core tool features or certain areas of the tool's modeling capabilities.

Advanced windows 308 and 322 include, but are not limited to, e.g., an imbalance between relative use of object model 112 constructs, such as too many classes with very few objects, validation of an object model 112 through an object model 112 execution function of the modeling tool 110, and to encourage the user to use imprecise definitions for classes and precise definitions for objects, instead of precise definitions for classes and imprecise definitions for objects.

The user may turn off one or more of the interactive modeling agent 116 windows 308 or 322 depending on his or her relative skill in using the modeling tool 110. The user may also turn off entire classes of windows 308 or 322, such as the novice class of windows 308 or 322 as described above.

The buttons 312 or 326 may include a button to automatically perform the object model 112 construct that interactive modeling agent 116 is suggesting. This allows interactive modeling agent 116 to "self-model" the object model 112 for the user. Once interactive modeling agent 116 performs the "self-modeling," the user has an opportunity to view the interactive modeling agent 116 created model, and if the user does not like the final model, the user can "undo" the object model 112 created by interactive modeling agent 116 by clicking on another button 312 or 326 in the window 308 or 322. This gives even more flexibility to novice and advanced users, and makes modeling an even more efficient task.

Implementation

Figure 4:
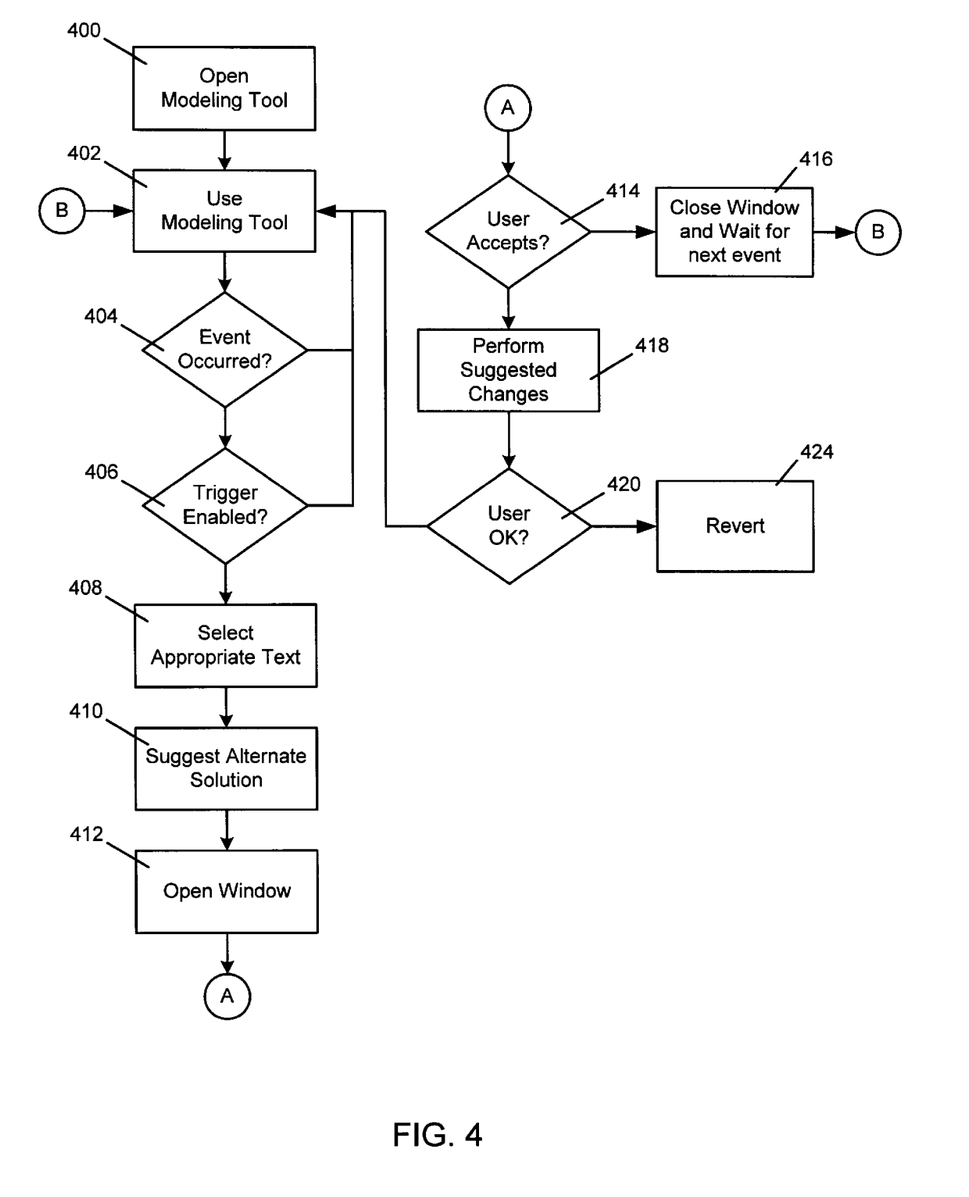
FIG. 4 is a flowchart showing the steps used in the present invention.

FIG. 4 is a flowchart showing the steps used in the present invention. Block 400 represents the computer 102 executing the modeling tool 110 and storing the object model 112 in the computer. Block 402 represents the computer 102, under the control of the modeling tool 110, creating or editing an object model 112. Block 404 is a decision block that represents the computer 102, under the control of the modeling tool 110, determining whether a specified event occurred during the creating or editing of the object model 112. Once a predetermined event occurs, block 406 represents the computer 102, under the control of the modeling tool 110, triggering the interactive modeling agent 116. Block 408 represents the computer 102, under the control of the interactive modeling agent 116, selecting the appropriate information to display to the user for the specified event. Additionally, if appropriate, block 410 represents the computer 102, under the control of the interactive modeling agent 116, determining one or more alternate solutions for the user for the specified event. Once information has been selected and the alternative solution determined, block 412 represents the computer 102, under the control of the interactive modeling agent 116, opening a window or view on the monitor 120 and displaying the selected information and alternative solution to the user on the monitor 120.

Block 414 is a decision block that represents the computer 102, under the control of the interactive modeling agent 116, waiting for user acceptance of the suggested alternative solution. If the user does not accept the alternative solution, block 416 represents the computer 102, under the control of the interactive modeling agent 116, closing the window or view on the monitor 120 and waiting for the next predetermined event. Block 418 represents the computer 102, under the control of the interactive modeling agent 116, making the changes to the object model 112 that were suggested by the interactive modeling agent 116 after user acceptance.

Block 420 is a decision block that represents the computer 102, under the control of the interactive modeling agent 116, requesting user acceptance of the alternative solution. Block 424 represents the computer 102, under the control of the interactive modeling agent 116, reverting the object model 112 created according to the alternative solution suggested by the interactive modeling agent 116 back to the object model 112 that was created by the user.

Conclusion

This concludes the description of the preferred embodiment of the invention. The present invention discloses a method, apparatus, and article of manufacture for modeling object-oriented systems. In a preferred embodiment, the present invention comprises an object-oriented modeling tool that includes an intelligent modeling agent to assist the user in developing the object model.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of operating an object-oriented system, comprising the steps of:

(a) storing an object model in a computer;

(b) monitoring creation of the object model by an operator for an occurrence of a specified event, wherein the occurrence of the event itself indicates that the operator requires assistance in creation of the object model;

(c) automatically triggering an interactive modeling agent in the computer to interact with the operator when the monitoring step indicates the specified event in the object model occurred; and (d) displaying context information concerning modeling advice for creation of the object model on a monitor attached to the computer when the interactive modeling agent is triggered, wherein the modeling advice is selected based on the monitored event.

2. The method of claim 1, wherein the interactive modeling agent has a novice mode and an advanced mode, the step of triggering comprises the step of selecting either the novice mode or the advanced mode for the interactive modeling agent, and the step of displaying comprises the step of displaying context information concerning modeling advice for creation of the object model according to the selected novice mode or advanced mode.

3. The method of claim 2, wherein the triggering step further comprises the step of triggering the interactive modeling agent in the novice mode when the specified event is selected from a group comprising:

opening a window;

transitioning to another window in the program;

failing to use a feature in the object model;

defining more than a predetermined number of classes in the object model, defining less than a predetermined number of classes in the object model, defining more than a predetermined number of objects in the object model, defining less than a predetermined number of objects in the object model, defining too many methods in the object model, defining too few methods in the object model, defining too many states within objects of the object model, defining too few states within objects of the object model, defining too many states within classes of the object model, and defining too few states within classes of the object model.

4. The method of claim 2, wherein the triggering step further comprises the step of triggering the interactive modeling agent in the advanced mode when the specified event is selected from a group comprising:

imbalancing a construct in the object model;

validating the object model using a model execution facility;

failing to adhere to overall design methodologies in the object model;

not taking advantage of an applicable solution, wherein the applicable solution is selected from a group comprising a class library, a design pattern, a framework, and a subroutine.

5. The method of claim 2, wherein the novice mode includes the advanced mode.

6. The method of claim 1, further comprising the step of modifying an object within the object model according to the interactive modeling agent.

7. The method of claim 6, further comprising the step of reverting back the modified object within the object model.

8. The method of claim 1, wherein the step of monitoring is performed in real-time.

9. The method of claim 1, wherein the step of triggering can be disabled.

10. A computer-implemented object-oriented system, comprising:

a computer;

means for storing an object model in the computer;

means for monitoring creation of the object model by an operator for an occurrence of a specified event, wherein the occurrence of the event itself indicates that the operator requires assistance in creating the object model;

means for automatically triggering an interactive modeling agent in the computer to interact with the operator when the monitoring step indicates the specified event in the object model occurred; and means for displaying context information concerning modeling advice for creation of the object model on a monitor attached to the computer when the interactive modeling agent is triggered, wherein the modeling advice is selected based on the monitored event.

11. The apparatus of claim 10, wherein the interactive modeling agent has a novice mode and an advanced mode, a means for triggering comprises means for selecting either the novice mode or the advanced mode for the interactive modeling agent, and a means for displaying comprises means for displaying context information concerning alternative solutions for the operator in creating the object model according to the selected novice mode or advanced mode.

12. The apparatus of claim 11, wherein the means for triggering further comprises means for triggering the interactive modeling agent in the novice mode when the specified event is selected from a group comprising:

opening a window;

transitioning to another window in the program;

failing to use a feature in the object model;

defining more than a predetermined number of classes in the object model, defining less than a predetermined number of classes in the object model, defining more than a predetermined number of objects in the object model, defining less than a predetermined number of objects in the object model, defining too many methods in the object model, defining too few methods in the object model, defining too many states within objects of the object model, defining too few states within objects of the object model, defining too many states within classes of the object model, and defining too few states within classes of the object model.

13. The apparatus of claim 11, wherein the means for triggering further comprises means for triggering the interactive modeling agent in the advanced mode when the specified event is selected from a group comprising:

imbalancing a construct in the object model;

validating the object model using a model execution facility;

failing to adhere to overall design methodologies in the object model;

not taking advantage of an applicable solution, wherein the applicable solution is selected from a group comprising a class library, a design pattern, a framework, and a subroutine.

14. The apparatus of claim 11, wherein the novice mode includes the advanced mode.

15. The apparatus of claim 10, further comprising means for modifying an object within the object model according to the interactive modeling agent.

16. The apparatus of claim 15, further comprising means for reverting back the modified object within the object model.

17. The apparatus of claim 10, wherein means for monitoring is performed in real-time.

18. The apparatus of claim 10, wherein means for triggering can be disabled.

19. An article of manufacture comprising a program storage medium readable by a computer, the medium tangibly embodying one or more programs of instructions executable by the computer to perform method steps for operating an object-oriented system, the method comprising the steps of:

(a) storing an object model in the computer;

(b) monitoring creation of the object model by an operator for an occurrence of a specified event, wherein the occurrence of the event itself indicates that the operator requires assistance in creating the object model;

(c) automatically triggering an interactive modeling agent in the computer to interact with the operator when the monitoring step indicates the specified event in the object model occurred; and (d) displaying context information concerning modeling advice for creation of the object model on a monitor attached to the computer when the interactive modeling agent is triggered, wherein the modeling advice is selected based on the monitored event.

20. The article of manufacture of claim 19, wherein the interactive modeling agent has a novice mode and an advanced mode, the step of triggering comprises the step of selecting either the novice mode or the advanced mode for the interactive modeling agent, and the step of displaying comprises the step of displaying context information concerning alternative solutions for the operator in creating the object model according to the selected novice mode or advanced mode.

21. The article of manufacture of claim 20, wherein the triggering step further comprises the step of triggering the interactive modeling agent in the novice mode when the specified event is selected from a group comprising:

opening a window;

transitioning to another window in the program;

failing to use a feature in the object model;

defining more than a predetermined number of classes in the object model, defining less than a predetermined number of classes in the object model, defining more than a predetermined number of objects in the object model, defining less than a predetermined number of objects in the object model, defining too many methods in the object model, defining too few methods in the object model, defining too many states within objects of the object model, defining too few states within objects of the object model, defining too many states within classes of the object model, and defining too few states within classes of the object model.

22. The article of manufacture of claim 20, wherein the triggering step further comprises the step of triggering the interactive modeling agent in the advanced mode when the specified event is selected from a group comprising:

imbalancing a construct in the object model;

validating the object model using a model execution facility;

failing to adhere to overall design methodologies in the object model;

not taking advantage of an applicable solution, wherein the applicable solution is selected from a group comprising a class library, a design pattern, a framework, and a subroutine.

23. The article of manufacture of claim 20, wherein the novice mode includes the advanced mode.

24. The article of manufacture of claim 19, further comprising the step of modifying an object within the object model according to the interactive modeling agent.

25. The article of manufacture of claim 24, further comprising the step of reverting back the modified object within the object mode.

26. The article of manufacture of claim 19, wherein the step of monitoring is performed in real-time.

27. The article of manufacture of claim 19, wherein the step of triggering can be disabled.

* * * * *

UNITED STATES PATENT AND TRADEMARK OFFICE
CERTIFICATE OF CORRECTION

PATENT NO. : 5,907,706
DATED : May 25, 1999
INVENTOR(S) : Stephen Andrew Brodsky, et. al.

It is certified that error appears in the above-identified patent and that said Letters Patent is hereby corrected as shown below:

Column 12, claim 25, line 8, delete the word "mode" and replace with--model--

Signed and Sealed this

Eighth Day of February, 2000

Attest:

Q. TODD DICKINSON

Attesting Officer

Commissioner of Patents and Trademarks